Aug. 21, 1956    J. MARCO    2,759,517
APPARATUS FOR CONTINUOUS PRODUCTION OF A COMPOSITE
FOAM RUBBER SLAB AND FABRIC
Filed Dec. 10, 1954    2 Sheets-Sheet 1
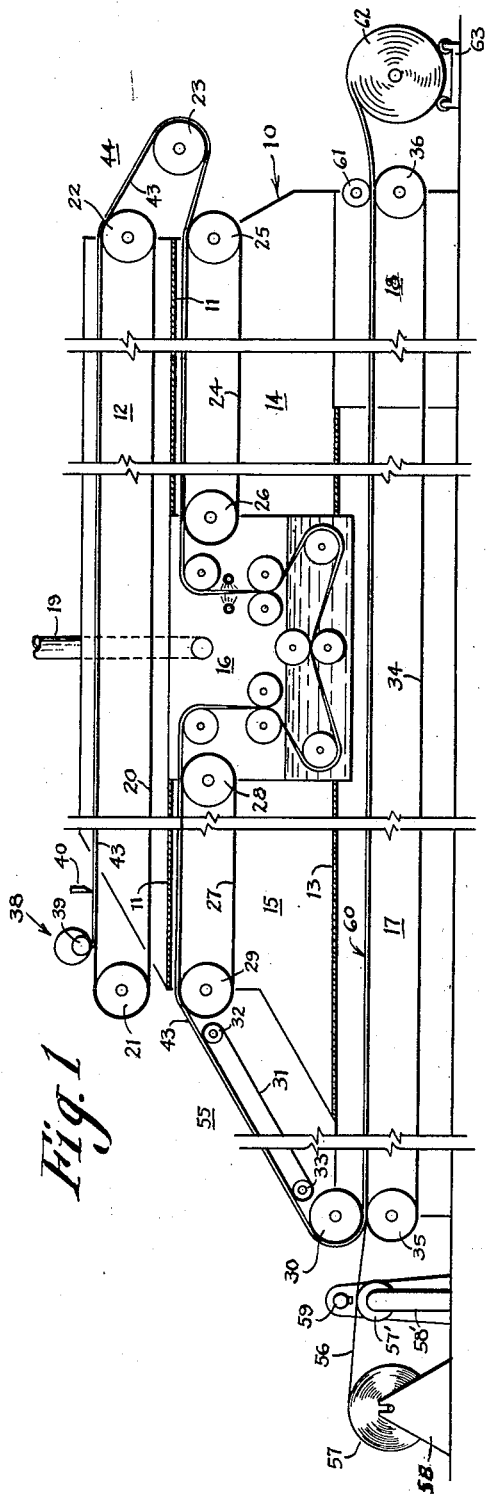
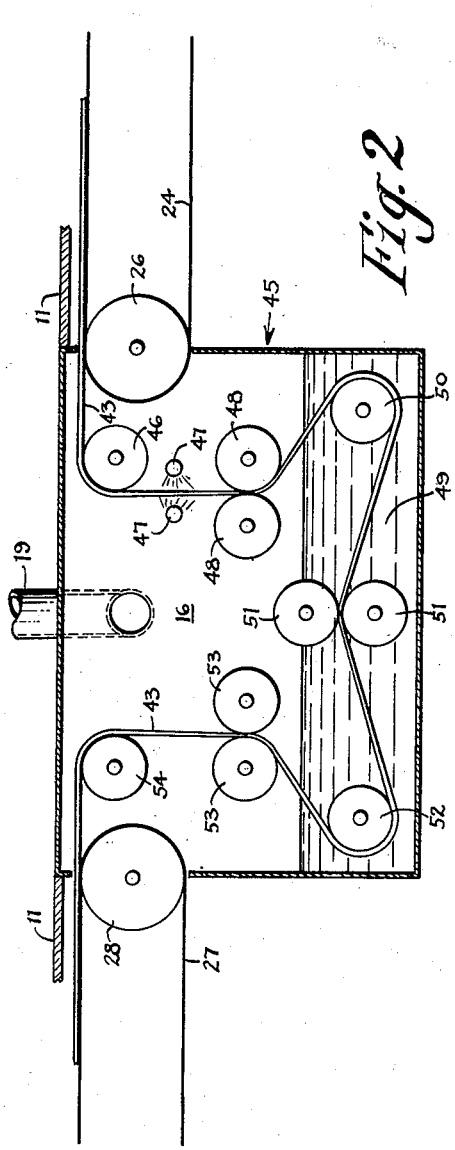
INVENTOR
JOHN MARCO
BY
ATTORNEYS Aug. 21, 1956  J. MARCO  2,759,517
APPARATUS FOR CONTINUOUS PRODUCTION OF A COMPOSITE
FOAM RUBBER SLAB AND FABRIC
Filed Dec. 10, 1954  2 Sheets-Sheet 2
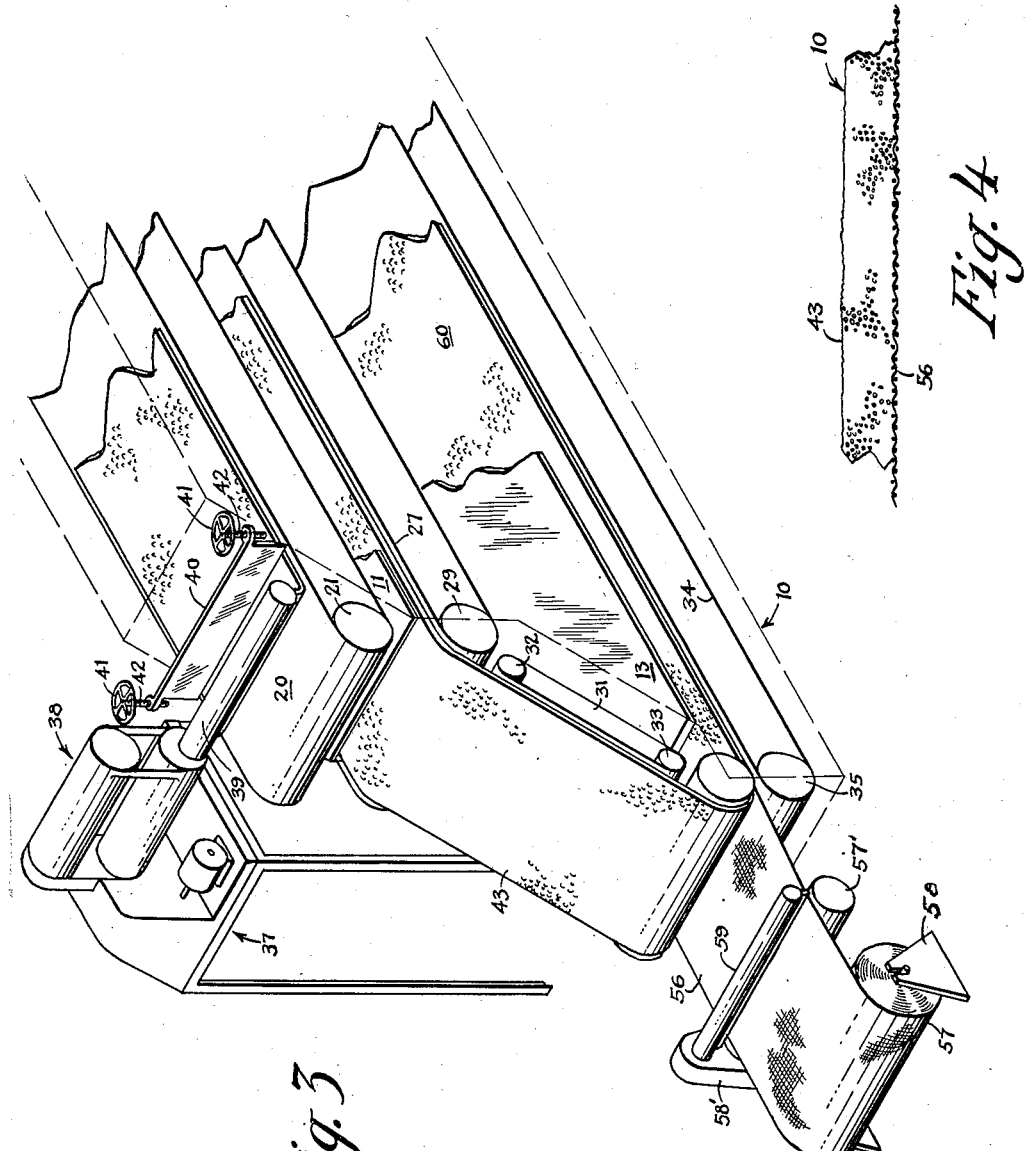
INVENTOR
JOHN MARCO
BY
ATTORNEYS

2,759,517
APPARATUS FOR CONTINUOUS PRODUCTION OF A COMPOSITE FOAM RUBBER SLAB AND FABRIC

John Marco, Saginaw, Mich.

Application December 10, 1954, Serial No. 474,499

9 Claims. (Cl. 154—1)

This invention relates to manufacturing and more particularly to an apparatus for producing a continuous composite strip of foam rubber and a fabric web.

Heretofore, numerous attempts have been made to produce a composite strip consisting of a slab of foam rubber and a fabric web, but considerable difficulty has been experienced in eliminating objectionable odors from the product and also it has been found that where the fabric web was united with the foam rubber prior to vulcanization and curing of such rubber that severe damage to the fibers of the web resulted due to the exposure to the relatively high temperature required for the vulcanizing and curing process. This damage particularly resulted where synthetic fibers were utilized for the web and likewise, in the prior art processes and apparatus where a washing operation was utilized to eliminate odors, it was found that the fabric web was very frequently damaged by immersion in the washing fluids.

In the prior art processes where the fabric web was united to the foam rubber prior to vulcanizing and curing the latter, it has been found that such vulcanizing and curing step must be materially slowed, since much lower temperatures than normal must be employed in order to avoid damage to the fibers of the fabric web. Consequently, any process and apparatus which will permit formation and partial vulcanization curing of the foam rubber slab prior to uniting the same with the web to form a composite strip and also where the slab may be thoroughly washed prior to such uniting in order to remove all objectionable odors, it will be seen that the process may be materially speeded up and that a superior product will result and one in which the fibers of the fabric web have in no way been damaged by exposure to relatively high temperatures or to a washing operation.

Rubber latex utilized for producing the foam rubber provided in the product of this invention is commonly prepared utilizing a combination of materials as for example, potassium oleates, sulphur, zinc oxide, anti-oxidents as well as other forms of chemical combinations and including gelation agents, as for example, sodium silico fluoride, these being incorporated in the latex in an aqueous suspension and after the foam has been generated and cured by means of vulcanization at a required temperature, the free water in the product goes off as vapor and pigment or other solid substances remain as free agents around the laminar walls of the foam rubber structure and these free agents largely contribute to the objectionable odor associated with foam rubber and may be readily removed by a suitable washing operation.

It has been found that by forming the foam rubber to a desired thickness and curing the same at the required temperature, after which the foam rubber slab is thoroughly washed, results in a product which is substantially odorless and which still retains all of the desirable characteristics of the foam rubber. This vulcanized and washed foam rubber slab may be subsequently united to a fabric web of natural or synthetic fibers at a relatively low temperature to form a composite strip and where such web is in the form of a rug the resulting product provides a rug having a resilient or yieldable foam rubber backing and in which there is no objectionable odor. This process further provides the opportunity to utilize a unitary apparatus in which the composite strip may be continuously produced in an endless length and cut at any desired location as the same is wound in a roll for storage and shipping.

It is accordingly an object of the invention to provide an apparatus for producing a foam rubber slab of uniform thickness, which slab is vulcanized and washed and thereafter bonded to a fabric web to produce a continuous composite strip.

A further object of the invention is the provision of an apparatus for producing a composite strip of foam rubber and fabric web in which vulcanizing and curing of the foam rubber slabs takes place at the required temperature, such slab being washed prior to bonding to the fabric web, which bonding takes place at a relatively low temperature.

A still further object of the invention is the provision of an apparatus for producing a continuous composite strip of foam rubber and fabric web in which the foam rubber slab may be inspected subsequent to a vulcanizing operation and prior to the washing operation and again inspected subsequent to the washing operation and prior to bonding the foam rubber slab to the fabric web.

Another object of the invention is the provision of an apparatus for producing a continuous composite strip of foam rubber and fabric web, which apparatus incorporates a washing section including means for treating the foam rubber slab with a detergent solution, means for removing a relatively large percentage of the detergent solution from the foam rubber slab thereafter thoroughly rinsing the slab there being means provided for squeezing during such rinsing operation and also including means for removing the rinsing fluid from the foam rubber slab.

A further object of the invention is the provision of an apparatus for producing a composite continuous strip of foam rubber and fabric web in which the foam rubber slab is partially cured and washed prior to bonding the same to the fabric strip for final vulcanization at a relatively low temperature.

A still further object of the invention is the provision of an apparatus for producing a composite continuous strip of foam rubber and fabric web in which the fibers of the fabric web undergo no physical change and in which the appearance thereof is not changed during bonding to the foam rubber slab.

Another object of the invention is the provision of a process for producing a continuous composite, odorless strip of foam rubber and fabric web in which the foam rubber slab is at least partially cured and thoroughly washed prior to bonding to the fabric web.

A further object of the invention is the provision of a process for making a composite continuous strip of foam rubber and fabric web in which the foam rubber is cured and vulcanized at a relatively high temperature prior to uniting the same with the fabric web at a relatively low temperature.

Further objects and advantages of the invention will be apparent from the following description taken in conjunction with the accompanying drawing wherein:

Fig. 1 is a longitudinal sectional view through an apparatus constructed in accordance with this invention and showing schematically the various sections of the apparatus and the path followed furing production of the product;

Fig. 2, a fragmentary longitudinal sectional view of the washing section of the apparatus of this invention;

Fig. 3, a fragmentary perspective view of one end of the apparatus of this invention and showing schematically the foam rubber generator, one of the inspection stations, the feeding means for the fabric web and the means for applying a bonding agent to such fabric web; and Fig. 4, a fragmentary sectional view of a composite foam rubber and fabric strip produced by the apparatus and process of this invention.

With continued reference to the drawing there is shown an apparatus constructed in accordance with this invention and which may well comprise an elongated chamber 10 providing a multi-purpose oven and within the chamber 10 there is a longitudinal partition 11 located in the upper part of the chamber 10 and providing a compartment 12 which may be heated in any suitable manner to provide a vulcanizing section for the foam rubber.

A longitudinal partition 13 is located in the lower portion of the chamber 10 and this partition 13 provides a further curing or treating section 14 at one end of the chamber 10 and between the partitions 11 and 13 and at the opposite end of the chamber 10 with a drying section 15. Between the treating section 14 and the drying section 15 is a washing section 16 containing suitable apparatus to be later described and which thoroughly washes and rinses the foam rubber as the same passes through the chamber 10.

Located below the partition 13 and within the chamber 10 is a bonding section 17 and adjacent the outlet end of the chamber 10 and communicating with the bonding section 17 is a cooling section 18. It is assumed, of course, that the further curing or treating section 14, the drying section 15 and the bonding section 17 will be suitably heated to the desired temperature for accomplishing the purpose of each section and also the cooling section 18 will be suitably cooled by any desired means to cool the complete product prior to removal from the chamber 10. The drying section 15 may be supplied with heated air from any desired source and moist, warm air may be vented from the drying section 15 in any suitable manner.

An endless conveyor 20 is disposed in the vulcanizing and curing section 12 and such conveyor may be carried by pulleys 21 and 22 rotatably mounted at the entrance and exit ends respectively of the vulcanizing section 12. A guide roller 23 is rotatably mounted exteriorly of the chamber 10 adjacent the exit end of the vulcanizing section 12 and an endless conveyor 24 is disposed in the treating section 14 and is carried by pulleys 25 and 26 located adjacent the entrance end of the treating section 14 and at a location where the treating section 14 communicates with the washing section 16. An endless conveyor 27 is disposed in the drying section 15 and is carried by pulleys 28 and 29 located respectively adjacent the outlet of the washing section 16 and the outlet of the drying section 15.

The guide roller 30 is rotatably mounted exteriorly of the chamber 10 and between the guide roller 30 and pulley 29 and substantially tangentially in alignment therewith is an endless conveyor 31 carried by pulleys 32 and 33 and the purpose of such conveyor 31 will be later described.

And endless conveyor 34 carried by pulleys 35 and 36 rotatably mounted respectively adjacent opposite ends of the chamber 10 extends entirely through the bonding chamber or section 17 and also through the cooling section 18.

Mounted on a platform or other suitable supporting means 37 adjacent the upper part of the forward end of the chamber 10 is a continuous foam rubber generator 38 which may be of any suitable well known type and which will operate to provide a continuous supply of foam rubber suitable for the purpose intended. The foam rubber generator 38 is provided with a discharge nozzle 39 located above the conveyor 20 and is arranged in such a manner as to discharge foam rubber in a continuous stream over substantially the entire width of the conveyor 20. Disposed adjacent the discharge nozzle 39 is a doctor blade 40 adjustably mounted above the conveyor 20 and extending throughout the entire width thereof, the spacing between the blade 40 and the conveyor 20 being adjustable by any suitable means, such as hand wheels 41 mounted on screw threaded spindles 42 which may be operated in a well known manner to move the doctor blade 40 toward or away from the upper surface of the conveyor 20. As the foam rubber deposited on the conveyor 20 from the discharge nozzle 39 passes beneath the lower edge of the doctor blade 40, the thickness of the foam rubber is accurately controlled in order to provide a slab of such foam rubber 43 disposed on the surface of the conveyor 20, this slab 43 being of uniform thickness.

The slab 43 of foam rubber is carried through the vulcanizing and curing section 12 by the conveyor 20 and, as stated above, such vulcanizing and curing section 12 may be heated in any desired manner to a suitable temperature for vulcanizing and curing the foam rubber slab 23 during the passage thereof through the section 12.

Upon leaving the vulcanizing and curing section 12, the foam rubber slab 43 passes over the guide roller 23 and between the pulley 22 at the end of the conveyor 20 and the guide roller 23, there is provided an inspection station 44 where the vulcanized or partially vulcanized and cured foam rubber slab 43 may be visually inspected.

From the guide roller 23 the foam rubber slab 43 passes into the treating section 14 in engagement with the conveyor 24 extending therethrough. The treating section 14 may be heated in any desired manner to provide a suitable temperature for further treatment for the foam rubber slab 43 or if no further treatment is necessary, the slab simply passes through this section on the conveyor 24 and is delivered to the washing section 16.

As best shown in Fig. 2, the washing section 16 may well comprise a substantially closed chamber 45 in which there is rotatably mounted a guide roller 46 for receiving the foam rubber slab 43 delivered from the conveyor 24. The foam rubber slab 43 passes over the guide roller 46 and downwardly in the chamber 45 between spray nozzles 47 which serve to spray a detergent solution over both side of the foam rubber slab 43. This detergent solution is of such a nature as to dissolve or otherwise remove the free solids and other foreign matter within the structure of the foam rubber slab 43 and which, if allowed to remain therein, would contribute to an objectionable odor. From the spray nozzles 47 the foam rubber slab 43 passes between opposed wringer rolls 48 which engage and squeeze the slab 43 in such a manner as to remove a substantial portion of the detergent solution therefrom.

In the lower portion of the chamber 45 there is provided a rinsing bath 49 of water or other suitable fluid and disposed beneath the surface of such bath 49 is a rotatably mounted guide roller 50 which serves to engage and guide the foam rubber slab 43 through the rinsing bath 49. Also disposed beneath the surface of the rinsing bath 49 are opposed, squeeze rolls 51 between which the slab 43 passes and these squeeze rolls 51 serve to expel a substantial portion of the rinsing fluid from the slab 43 and from the squeeze rolls 51, the slab 43 passes around a guide roller 52 also rotatably mounted beneath the surface of the rinsing bath 49. The action of the squeeze rolls 51 in conjunction with passage of the slab 43 through the rinsing bath 49 serves to thoroughly rinse the slab 43 and remove all detergent solution therefrom, as well as the foreign material and solids disposed within the structure of the slab 43 and dissolved or loosened by the detergent solution.

From the guide roll 52 the slab 43 passes upwardly between opposed wringer roll 53 rotatably mounted above the surface of the rinsing bath 49 and such wringer rolls 53 serve to remove a substantial part of the rinsing fluid from the foam rubber slab 43. From the wringer rolls 53 the foam rubber slab 43 passes over a guide roller 54 rotatably mounted within the chamber 45 adjacent the upper portion thereof, and from the guide roll 54, the foam rubber slab 43 passes into engagement with the conveyor 27 disposed in the drying section 15 of the chamber 10. As stated above, the drying section 15 may be suitable heated or supplied with heated air and while passing through this section, the foam rubber slab 43 is thoroughly dried and as a result of the washing and rinsing action in the washing section 16 and the drying of the foam rubber slab in the drying section 15, the same will emerge from the drying section 15 in a substantially odorless condition.

From the drying section 15 the foam rubber slab 43 passes into engagement with the conveyor 31 and opposite this conveyor 31 there is provided an inspection station 55 where the vulcanized and washed foam rubber slab 43 may be visually inspected for any flaws or imperfections therein. The foam rubber slab 43 moves from the inspection station 55 into engagement with the guide roller 30 and from such guide roller is directed into the bonding section 17.

A strip of fabric web 56 may be supplied from a roll 57 rotatably mounted on any suitable support 58 disposed adjacent the forward side of the chamber 10 and such fabric web 56 may be in the nature of a carpet or any other fabric of natural or synthetic fibers and of the character or finish desired, this fabric strip 56 passing over a supporting roll 57' rotatably mounted on a suitable support 58' and between and beneath an applicator 59 for applying a suitable bonding agent to the upper surface of the fabric web 56, this bonding agent being in the nature of latex cement or any other suitable bonding agent. From the applicator 59 the fabric web 56 passes onto the upper surface of the conveyor 34 between the upper surface thereof and the lower surface of the rubber slab 43 and in intimate engagement with the lower surface of such foam rubber slab 43. This forms a composite structure of the foam rubber slab and fabric web and such composite structure is carried through the bonding section 17 where the bonding agent deposited on the fabric web 56 is cured in a well known manner to securely bond the same to the foam rubber slab 43. The bonding section 17 may be suitably heated or otherwise conditioned in order to effect a suitable cure of the bonding agent. The length of the bonding section 17 is sufficient to accomplish a complete cure of the bonding agent and from this bonding section 17, the composite foam rubber slab and fabric web 60 passes into the cooling section 18 where the same is cooled to substantially room temperature and adjacent the exit end of the cooling section 18, a feed roll 61 engages the composite product 60 to remove the same therefrom and such product may be conveniently in a roll 62 mounted on a suitable support 63 at the exit end of the chamber 10.

As shown in Fig. 4, the resulting product includes the relatively thick foam rubber slab 43 which is bonded to the fabric web 56 and in the event the web 56 is in the form of a carpet, the foam rubber slab 43 provides a yieldable backing therefor, which materially reduces wear on the fabric web 56 and precludes the necessity for utilizing a separate pad or the like beneath a conventional carpet. The composite strip 60 made up of the foam rubber slab 43 and the fabric web 56 is substantially odorless as a result of the washing and rinsing operation and since the fabric web 56 is only subjected to the relatively low temperature of the bonding section 17, the fibers thereof, whether they are natural or synthetic, are in no way damaged and the web 56 maintains its original appearance. The resulting product may be cleaned in any conventional manner, as by a vacuum cleaner or may be shampooed or otherwise cleaned in the same manner as conventional carpets. The fabric web 56 has been referred to as a carpet merely for illustrative purposes and obviously, such web may be of any desired character and the product may, of course, be utilized wherever a composite strip of foam rubber and fabric web may be desirable.

The apparatus and process of this invention permits a continuous operation and a relatively high rate of speed and the resulting product may be cut to any desired length and formed in a roll for convenient storage or transportation. While the roll 57 of the fabric web 56, the applicator 59 and the receiving roll 62 are shown for convenience, as separate from the chamber 10, obviously, these may all be incorporated into an integral apparatus thereby permitting convenient manufacture, shipping and installation of the same.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. Apparatus for continuous production of composite foam rubber slab and fabric web in the form of a continuous composite strip, said apparatus comprising an elongated oven having a relatively high temperature vulcanizing section in the upper portion, a further curing or treating section including washing and rinsing apparatus and a drying section in the intermediate portion of said oven and a relatively low temperature slab and web bonding section and cooling means in the lower portion of said oven, an endless conveyor extending throughout the length of said vulcanizing sections, a foam rubber generator for depositing foam on said conveyor, means for maintaining said foam in a slab of uniform thickness on said conveyor, said conveyor serving to support and carry said slab through said vulcanizing sections for vulcanizing and curing the same, a guide roller exteriorly of said oven at the exit end of said vulcanizing section, said slab traveling over said guide roller to provide an inspection station, an endless conveyor in said treating section, said slab re-entering said oven from said guide roller and engaging said last named conveyor to be supported and carried through said last named section and delivered to said washing and rinsing apparatus disposed intermediate the length of said oven, said washing and rinsing apparatus including means for spraying a detergent solution on opposite sides of said slab, opposed wringer rolls engaging said slab for squeezing said solution therefrom, a rinsing bath and squeeze rolls beneath the surface of said bath for facilitating the rinsing of said slab passing therethrough and wringer rolls disposed above said bath for squeezing rinsing solution from said slab, an endless conveyor in said drying section, said slab being carried by said last named conveyor from said washing and rinsing apparatus through said drying section to dry said slab, a conveyor exteriorly of said oven for receiving said slab from said drying section for conveying the same by a second inspection station, an endless conveyor in said bonding and cooling section to receive said slab from said last named conveyor, means to supply a web of fabric, means to apply a bonding agent to one surface of said web, means to feed said web to said last named conveyor in fact to fact contact with said slab, said last named conveyor serving to carry said slab and web through said bonding section to cure said bonding agent and provide a continuous composite strip of material and through said cooling section to cool the same and winding means for receiving said composite strip.

2. Apparatus for continuous production of a composite foam rubber slab and web in the form of a continuous composite strip, said apparatus comprising an elongated oven having a relatively high temperature vulcanizing section in the upper portion, a treating section including a washing and rinsing apparatus and a drying section in the intermediate portion of said oven and a relatively low temperature slab and web bonding section and cooling means in the lower portion of said oven, an endless conveyor extending throughout the length of said vulcanizing section, a foam rubber generator for depositing foam on said conveyor, means for maintaining said foam in a slab of uniform thickness on said conveyor, said conveyor serving to support and carry said slab through said vulcanizing section for vulcanizing and curing the same, a guide roller exteriorly of said oven at the exit end of said vulcanizing section, said slab traveling over said guide roller to provide an inspection station, an endless conveyor in said treating section, said slab re-entering said oven from said guide roller and engaging said last named conveyor to be supported and carried through said last named section and delivered to said washing and rinsing apparatus disposed intermediate the length of said oven, said washing and rinsing apparatus including means for spraying a detergent solution on opposite sides of said slab, opposed wringer rolls engaging said slab for squeezing said solution therefrom, a rinsing bath and squeeze rolls beneath the surface of said bath for facilitating the rinsing of said slab passing therethrough and wringer rolls disposed above said bath for squeezing rinsing solution from said slab, an endless conveyor in said drying section, said slab being carried by said last named conveyor from said washing and rinsing apparatus through said drying section to dry said slab, a conveyor exteriorly of said oven for receiving said slab from said drying section for conveying the same by a second inspection station, an endless conveyor in said bonding and cooling section to receive said slab from said last named conveyor, means to supply a web, means to apply a bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

3. Apparatus for continuous production of a composite foam rubber slab and web in the form of a continuous composite strip, said apparatus comprising an elongated oven having a relatively high temperature vulcanizing section, a treating section including washing and rinsing apparatus and a drying section and a relatively low temperature slab and web bonding section and cooling means, an endless conveyor extending throughout the length of said vulcanizing section, a foam rubber generator for depositing foam on said conveyor, means for maintaining said foam in a slab of uniform thickness on said conveyor, said conveyor serving to support and carry said slab through said vulcanizing section for vulcanizing and curing the same, an inspection station at the exit end of said vulcanizing section, an endless conveyor in said treating section, said slab re-entering said oven from said inspection station and engaging said last named conveyor to be supported and carried through said last named section and delivered to said washing and rinsing apparatus disposed intermediate the length of said oven, said washing and rinsing apparatus including means for spraying a detergent solution on opposite sides of said slab, opposed wringer rolls engaging said slab for squeezing said solution therefrom, a rinsing bath and squeeze rolls beneath the surface of said bath for facilitating the rinsing of said slab passing therethrough and wringer rolls disposed above said bath for squeezing rinsing solution from said slab, an endless conveyor in said drying section, said slab being carried by said last named conveyor from said washing and rinsing apparatus to said drying section to dry said slab, a second inspection station, an endless conveyor in said bonding and cooling section to receive said slab from said second inspection station, means to supply a web, means to apply a bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

4. Apparatus for continuous production of a composite foam rubber slab in the form of a continuous composite strip, said apparatus comprising an elongated oven having a relatively high temperature vulcanizing section, a treating section including washing and rinsing apparatus and a drying section and a relatively low temperature slab and web bonding section and cooling means, a conveyor in said vulcanizing section, a foam rubber generator for depositing foam on said conveyor, said conveyor serving to support and carry said foam in the form of a slab through said vulcanizing section for vulcanizing and curing the same, an inspection station at the exit end of said vulcanizing section, a conveyor in said treating section, said slab re-entering said oven from said inspection station and engaging said last named conveyor to be supported and carried through said last named section and delivered to said washing and rinsing apparatus disposed intermediate the length of said oven, said washing and rinsing apparatus including means for spraying a detergent solution on opposite sides of said slab, opposed wringer rolls engaging said slab for squeezing said solution therefrom, a rinsing bath and squeeze rolls beneath the surface of said bath for facilitating rinsing of said slab passing therethrough and wringer rolls disposed above said bath for squeezing the rinsing solution from slab, a conveyor in said drying section, said slab being carried by said last named conveyor from said washing and rinsing apparatus through said drying section to dry said slab, a second inspection station, a conveyor in said bonding and cooling section to receive said slab from said second inspection station, means to supply a web, means to apply a bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

5. Apparatus for continuous production of a composite foam rubber slab and web in the form of a continuous composite strip, said apparatus comprising an elongated oven having a relatively high temperature vulcanizing section, a treating section including washing and rinsing apparatus and a drying section and a relatively low temperature slab and web bonding section and cooling means, a conveyor in said vulcanizing section, a foam rubber generator for depositing foam on said conveyor, said conveyor serving to support and carry said foam in the form of a slab through said vulcanizing section for vulcanizing the same, a conveyor in said treating section, said slab reentering said oven from said vulcanizing section and engaging said last named conveyor to be supported and carried through said last named section and delivered to said washing and rinsing apparatus disposed intermediate the length of said oven, said washing and rinsing apparatus including means for spraying a detergent solution on opposite sides of said slab, opposed wringer rolls engaging said slab for squeezing said solution therefrom, a rinsing bath and squeeze rolls beneath the surface of said bath for facilitating the rinsing of said slab passing therethrough and wringer rolls disposed above said bath for squeezing rinsing solution from said slab, a conveyor in said drying section, said slab being carried by said last named conveyor from said washing and rinsing apparatus through said drying section to dry said slab, a conveyor in said bonding and cooling section to receive said slab from said drying section, means to supply a web, means to apply a bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

6. Apparatus for continuous production of a composite foam rubber slab and web in the form of a continuous composite strip, said apparatus comprising an elongated oven having a relatively high temperature vulcanizing section, a treating section including washing and rinsing apparatus and a drying section and a relatively low temperature slab and web bonding section and cooling means, a conveyor in said vulcanizing section, a foam rubber generator for depositing foam on said conveyor, said conveyor serving to support and carry said foam in the form of a slab through said vulcanizing section for vulcanizing and curing the same, a conveyor in said treating section, said slab re-entering said oven from said vulcanizing section and engaging said last named conveyor to be supported and carried through said last named section and delivered to said washing and rinsing apparatus disposed intermediate the length of said oven, said washing and rising apparatus including means for treating said slab with a detergent solution, means for removing said solution therefrom, a rinsing bath and squeeze rolls beneath the surface of said bath for facilitating the rinsing of said slab passing therethrough and wringer rolls disposed above said bath for squeezing rinsing solution from said slab, a conveyor in said drying section, said slab being carried by said last named conveyor from said washing and rinsing apparatus through said drying section to dry said slab, a conveyor in said bonding and cooling section to receive said slab from said drying section, means to supply a web, means to apply a bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

7. Apparatus for continuous production of a composite foam rubber slab and web in the form of a continuous composite strip, said apparatus comprising an elongated oven having a relatively high temperature vulcanizing section, a treating section including washing and rinsing apparatus and a drying section and a relatively low temperature slab and web bonding section and cooling means, a conveyor in said vulcanizing section, a foam rubber generator for depositing foam on said conveyor, said conveyor serving to support and carry said foam in the form of a slab through said vulcanizing section for vulcanizing and curing the same, a conveyor in said treating section, said slab re-entering said oven from said vulcanizing section and engaging said last named conveyor to be supported and carried through said last named section and delivered to said washing and rinsing apparatus disposed intermediate the length of said oven, said washing and rinsing apparatus including means for treating said slab with a detergent solution, means for removing said solution therefrom, a rinsing bath and squeeze rolls beneath the surface of said bath for facilitating the rinsing of said slab passing therethrough and means for removing rinsing solution from said slab, a conveyor in said drying section, said slab being carried by said last named conveyor from said washing and rinsing apparatus through said drying section to dry said slab, a conveyor in said bonding and cooling section to receive said slab from said drying section, means to supply a web, means to apply bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

8. Apparatus for continuous production of a composite foam rubber slab and web in the form of a continuous composite strip, said apparatus comprising an elongated oven having a relatively high temperature vulcanizing section, a treating section including washing and rinsing apparatus and a drying section and a relatively low temperature slab and web bonding section and cooling means, a conveyor in said vulcanizing section, a foam rubber generator for depositing foam on said conveyor, said conveyor serving to support and carry said foam in the form of a slab through said vulcanizing section for vulcanizing and curing the same, a conveyor in said treating section to receive said slab from said vulcanizing section to be supported and carried through said treating section and delivered to said washing and rinsing apparatus, said washing and rinsing apparatus including means for treating said slab with a detergent solution, means for removing said solution therefrom, means for rinsing said slab and means for removing rinsing solution from said slab, a conveyor in said drying section, said slab being carried by said last named conveyor from said washing and rinsing apparatus through said drying section to dry said slab, a conveyor in said bonding and cooling section to receive said slab from said drying section, means to supply a web, means to apply a bonding agent to one surface of said web, means to feed said web to said last named conveyor in face to face contact with said slab, said last named conveyor serving to carry said slab and web through said bonding section to cure said bonding agent and provide a continuous composite strip of material and through said cooling section to cool the same.

9. Apparatus for continuous production of a composite foam rubber slab and web in the form of a continuous composite strip, said apparatus comprising an elongated oven having a relatively high temperature vulcanizing section, washing and rinsing apparatus and a drying section and a relatively low temperature slab and web bonding section, a conveyor in said vulcanizing section, a foam rubber generator for depositing foam on said conveyor, said conveyor serving to support and carry said foam in the form of a slab through said vulcanizing section for vulcanizing and curing the same, means to deliver said vulcanized slab to said washing and rinsing apparatus, said washing and rinsing apparatus including means for treating said slab with a detergent solution, means for removing said solution therefrom, means for rinsing said slab and means for removing rinsing solution from said slab, a conveyor in said drying section, said slab being carried by said last named conveyor from said washing and rinsing apparatus through said drying section to dry said slab, a conveyor in said bonding section to receive said slab from said drying section, means to supply a web means to apply a bonding agent to one surface of said web, means to feed said web to said last named conveyor in face to face contact with said slab, said last named conveyor serving to carry said slab and web through said bonding section to cure said bonding agent and provide a continuous composite strip of material.

References Cited in the file of this patent

UNITED STATES PATENTS

| | | |
|---|---|---|
| 2,567,952 | Lewis | Sept. 8, 1951 |
| 2,641,296 | Marco | June 9, 1953 |